(12) United States Patent
Lin

(10) Patent No.: US 9,696,561 B2
(45) Date of Patent: Jul. 4, 2017

(54) LINKAGE STRUCTURE FOR RIM AND SPECTACLE LENSES AND SPECTACLES

(71) Applicant: Juei Tse Lin, Taipei (TW)

(72) Inventor: Juei Tse Lin, Taipei (TW)

( * ) Notice: Subject to any disclaimer, the term of this patent is extended or adjusted under 35 U.S.C. 154(b) by 3 days.

(21) Appl. No.: 14/883,747

(22) Filed: Oct. 15, 2015

(65) Prior Publication Data

US 2017/0108707 A1   Apr. 20, 2017

(51) Int. Cl.
*G02C 1/04* (2006.01)

(52) U.S. Cl.
CPC ........... *G02C 1/04* (2013.01); *G02C 2200/06* (2013.01)

(58) Field of Classification Search
CPC ... G02C 1/04; G02C 1/06; G02C 1/08; G02C 1/10; G02C 5/006; G02C 5/02; G02C 5/08; G02C 5/122; G02C 5/124; G02C 5/143; G02C 5/18; G02C 5/22; G02C 5/2209; G02C 5/2218; G02C 5/2227; G02C 5/2236
USPC ............................... 351/48, 52, 58, 106–119
See application file for complete search history.

(56) References Cited

U.S. PATENT DOCUMENTS

2008/0137028 A1*  6/2008  Webb .................. G02C 1/04
                                                            351/106
2012/0038879 A1*  2/2012  Reyes ................. A61F 9/025
                                                            351/107

* cited by examiner

*Primary Examiner* — Scott J Sugarman
*Assistant Examiner* — Mustak Choudhury
(74) *Attorney, Agent, or Firm* — Jackson IPG PLLC; Demian K. Jackson

(57) ABSTRACT

A linkage structure for rim and spectacle lenses and spectacles, comprising a rim and two spectacle lenses. The rim comprises left and right half rims. Characteristics: there is a holding groove inside the outer ends of two half rims respectively, connected to a turning block rotatablely. There is a bulge on the outer ends of two spectacle lenses respectively. The bulge is held in the holding groove of half rim. The turning block is turned, one end supports the bulge of spectacle lens, the bulge of spectacle lens is confined in the holding groove of half rim, and it is turned reversely to release one end from the spectacle lens. There is an elastic piece between the turning block and outer end of half rim. The elastic piece applies elastic pretightening force to limit the contrarotation of turning block.

10 Claims, 4 Drawing Sheets

LINKAGE STRUCTURE FOR RIM AND SPECTACLE LENSES AND SPECTACLES

BACKGROUND OF INVENTION

1. Field of the Invention

The present invention relates to the field of spectacles, and more particularly to a linkage structure for rim and spectacle lenses and spectacles.

2. Description of Related Art

The spectacles are closely related to our life, the spectacles on the market are classified into full-rim spectacles, half-rim spectacles and rimless spectacles. The rim of half-rim spectacles comprises two half rims for assembling lenses and connecting the earpieces. In traditional half-rim spectacles, the spectacle lenses are fixed to the rim, it is inconvenient to change lenses or the spectacles frame. Therefore, a new type of half-rim spectacles has emerged, the rim and the spectacle lenses are detachable. However, a considerable strength (forcing action) is required for assembling or disassembling the spectacle lenses of such half-rim spectacles, and some skills are required, so as to implement the assembly or disassembly of spectacle lenses. Obviously, the assembly and disassembly are inconvenient, and the spectacles are likely to be damaged.

SUMMARY OF THE INVENTION

The purpose of the present invention is to overcome the deficiencies in the existing technology, a linkage structure for rim and spectacle lenses and spectacles are provided, firm, convenient and labor saving, and the spectacle lenses and rim will not be damaged.

The technical proposal used in the present invention to solve the technical problems is: a linkage structure for rim and spectacle lenses, comprising a rim and two spectacle lenses. The rim comprises left and right half rims. There is a holding groove inside the outer end of two half rims, connected to a turning block rotatablely. The outer end of two spectacle lenses has a bulge. The bulge is held in the holding groove of half rim. The turning block is turned, one end supports the bulge of spectacle lens, the bulge of spectacle lens is confined in the holding groove of half rim, and it is turned reversely to release one end from the spectacle lens. There is an elastic piece between the turning block and outer end of half rim. The elastic piece applies the elastic pretightening force to limit the contrarotation of turning block. There is a separable positioning structure between the inner end of spectacle lens and the inner end of half rim.

Said elastic piece is a spring. The spring connects the outer end of said half rim to the opposite inside of the other end of said turning block.

Said turning block is connected to the outer end of said half rim rotatablely by a pin. Said elastic piece is a U-shaped elastic buckle clamp. The elastic buckle clamp fits over the pin, and both ends support the outer end of said half rim and said turning block respectively.

Said turning block is connected to the outer end of said half rim rotatablely by a pin. Said elastic piece is a torsion spring. The torsion spring fits over the pin, and both ends support the outer end of said half rim and said turning block respectively.

Said separable positioning structure comprises a through groove in the inner end of said spectacle lens and a tenon in the inner end of said half rim, the tenon matches the groove.

There is an opening in the opposite inner ends of the holding groove of said two half rims respectively, to make room for the bulge of said spectacle lens. There is an indentation in the outer end side of said spectacle lens, the upside structure of the indentation forms said bulge. The indentation buckles the underside structure of said holding groove.

Said turning block has a vertically through hole for said pin. There is a gap in the side of said turning block, the gap penetrates through said through hole to divide the through hole into upper and lower parts. The spiral part of said torsion spring is in the gap.

Said turning block has a vertically through hole for said pin. There is a gap in the side of said turning block, the gap penetrates through said through hole to divide the through hole into upper and lower parts. Said elastic buckle clamp matches the gap.

The other end side of said turning block has an antislip stripe. The antislip stripe is on the side against said holding groove.

A type of spectacles comprises two earpieces and a linkage structure for rim and spectacle lenses stated above. The front ends of two earpieces are connected to the outer ends of said two half rims respectively.

The beneficial effect of the present invention is that there is a holding groove inside the outer end of two half rims, there is a corresponding bulge on the outer end side of two spectacle lenses, and the bulge of spectacle lens is held in the holding groove. The outer end of two half rims is connected to a turning block rotatablely. The turning block is turned, one end confines the bulge of spectacle lens in the holding groove of half rim. To disassemble the spectacle lens, as long as the turning block is turned reversely, one end of the turning block is kept away from the bulge of spectacle lens to make room for the bulge of spectacle lens, then the spectacle lens can be removed from the spectacles frame. The present invention connects the turning block to the outer end of half rim by an elastic piece. The elastic piece applies elastic pretightening force to limit the contrarotation of turning block, so that the turning block can keep confining the spectacle lens when the spectacle lens is assembled, it is unlikely to rotate by accident, the connection is steadier. In addition, the elastic piece makes the hand feeling better. Therefore, compared with the existing technology, the present invention is characterized by steady connection, good hand feeling, convenient lens assembly and disassembly, labor saving and protecting lenses and spectacles frame.

The present invention is further expounded by the following attached figures and embodiments. However, the linkage structure for rim and spectacle lenses and spectacles of the present invention are not limited to the embodiments. Said rotor has a locking pin. There is an insert hole in the bulge of said rimless lens. When said bulge plugs in the plug hole, the insert hole is exposed outside the back end of said plug hole. Said rotor rotates to drive the locking pin to enter or withdraw from the insert hole of said bulge.

DETAILED DESCRIPTION OF THE INVENTION

Embodiment 1

Figure 1:
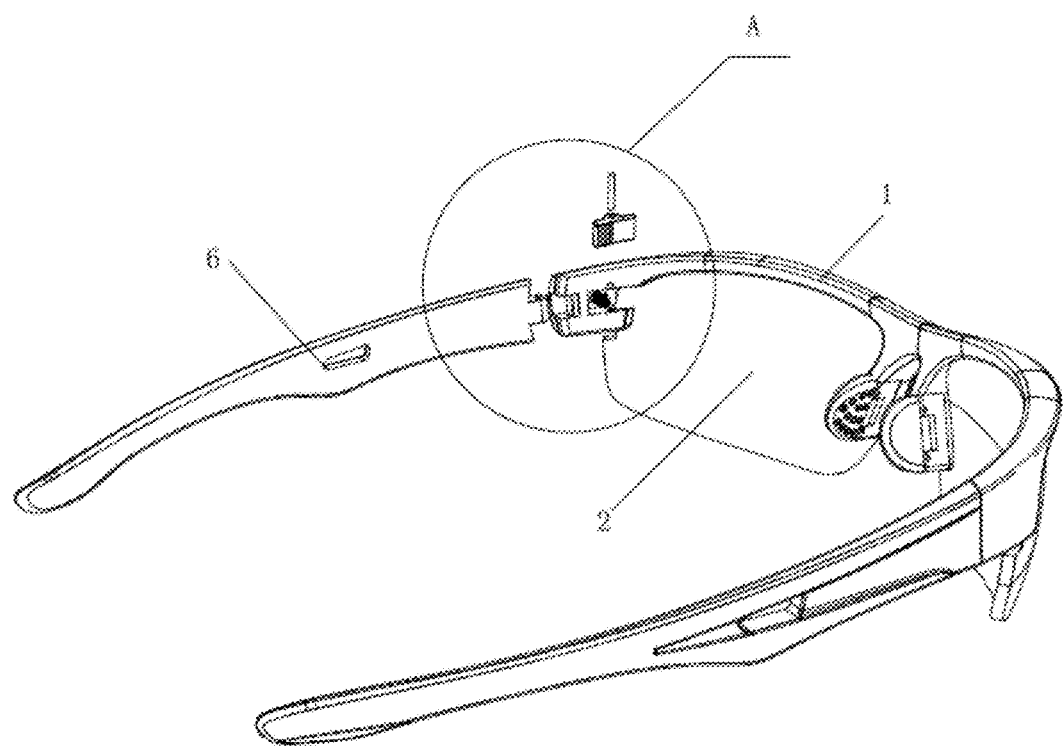
FIG. 1 is the exploded view of Embodiment 1 of the present invention.
Figure 2:
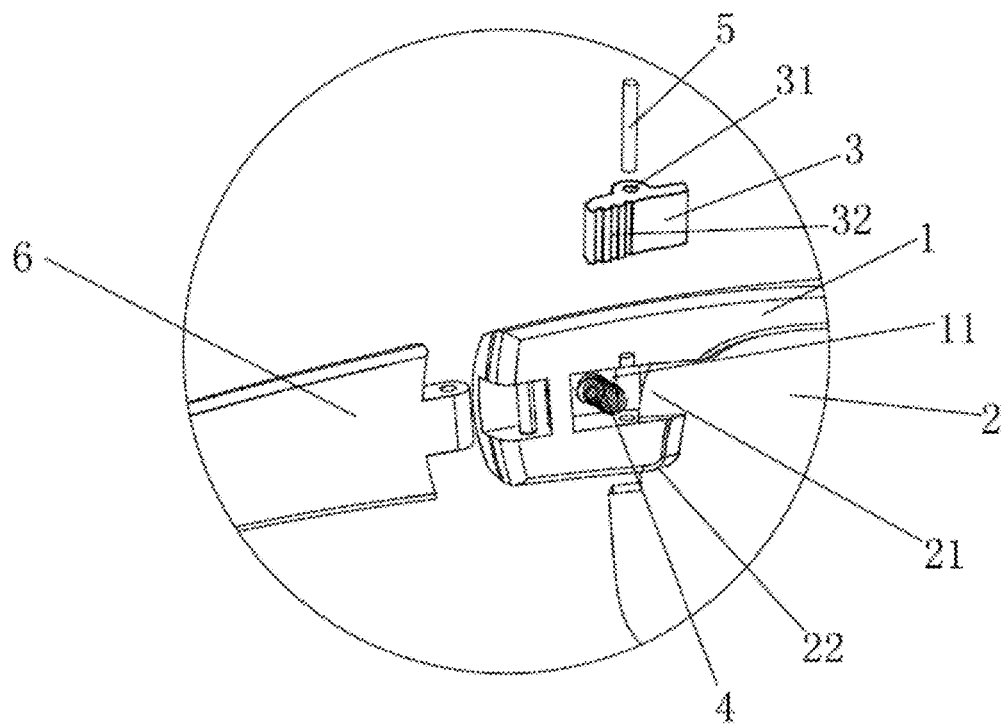
FIG. 2 is the enlarged view of Part A in FIG. 1 of Embodiment 1 of the present invention.
Figure 3:
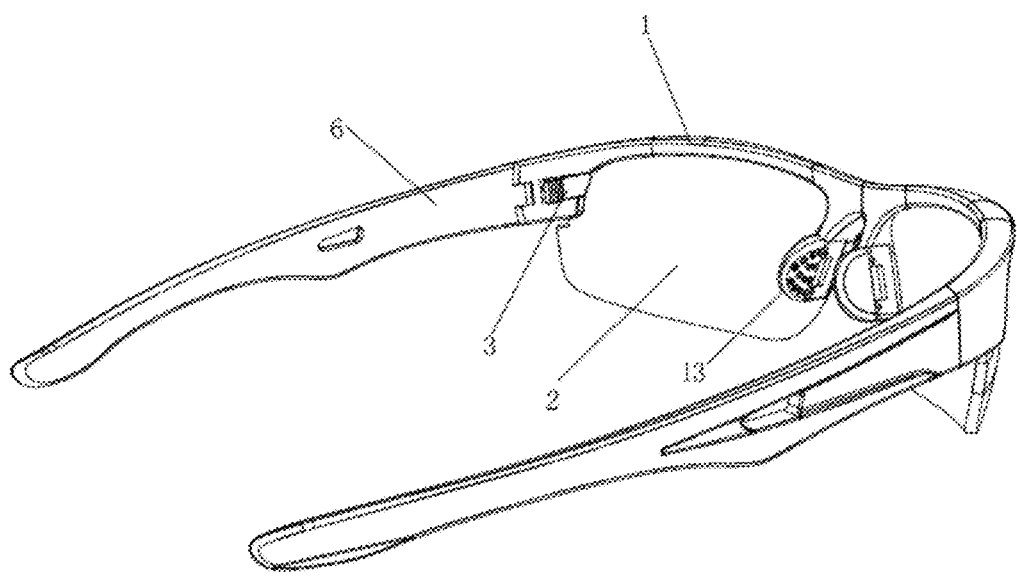
FIG. 3 is the structural representation after assembly of Embodiment 1 of the present invention.

As shown in FIG. 1 to FIG. 3, the linkage structure for rim and spectacle lenses of the present invention comprises a rim and two spectacle lenses 2. The rim comprises left and right half rims 1. There is a holding groove 11 inside the outer ends of two half rims 1 respectively, connected to a turning block 3 rotatablely. There is a bulge 21 at the outer ends of two spectacle lenses 2 respectively, the bulge 21 is held in the holding groove 11 of half rim 1. The turning block 3 rotates to make one end support the bulge 21 of spectacle lens 2. The bulge 21 of spectacle lens 2 is confined in the holding groove 11 of half rim 1, and one end is released from the spectacle lens 2 by contrarotation. There is an elastic piece between the turning block 3 and the outer end of half rim 1. The elastic piece applies elastic pretightening force to limit the contrarotation of turning block 3. There is a separable positioning structure 13 between the inner end of spectacle lens 2 and the inner end of half rim 1.

There is an opening in the opposite inner ends of the holding groove 11 of said two half rims 1 respectively, to make room for the bulge 21 of said spectacle lens 2. There is an indentation 22 at the outer end side of said spectacle lens 2, the upside structure of the indentation 22 forms said bulge 21. The indentation 22 buckles the underside structure of said holding groove 11.

As an optimization, said elastic piece is spring 4. The spring 4 connects the outer end of said half rim 1 to the opposite inside of one end of said turning block 3. Said turning block 3 is connected to the outer end of said half rim 1 rotatablely by a pin 5. Said spring 4 is located between the outer end of said half rim 1 and the opposite inside of the other end of said turning block 3. The pin 5 can be a threadless pin, or a screw. To be specific, there is a vertically through hole 31 in the middle of said turning block 3, the pin 5 passes through the through hole 31, and both ends connect upper and lower sides of said holding groove 11 respectively, so that said turning block 3 can revolve around pin 5. Said spring 4 is located between the holding groove 11 and the opposite inside of the other end of turning block 3.

As an optimization, said separable positioning structure 13 comprises a through groove at the inner end of said spectacle lens 2 and a tenon at the inner end of said half rim 1, the tenon matches the groove.

As an optimization, the other end side of said turning block 3 has an antislip stripe 32. The antislip stripe is on the side against said holding groove 11.

In terms of the linkage structure for rim and spectacle lenses of the present invention, to assemble the spectacle lens 2, the other end of turning block 3 is pressed by hand, one end of turning block 3 is rolled out of the holding groove 11 overcoming the force of spring 4. Afterwards, the outer bulge 21 of spectacle lens 2 is held in the holding groove 11 of half rim 1, the inner groove of spectacle lens 2 buckles the inner tenon of half rim 1. Finally, the turning block 3 is released, the turning block 3 rotates towards the inner end of holding groove 11 under the restoring force of spring 4, till one end contacts the bulge 21 of spectacle lens 2, confining the bulge 21 of spectacle lens 2 in the holding groove 11 of half rim 1 firmly, the spectacle lens 2 is fixed to the rim.

To disassemble spectacle lens 2, the other end of turning block 3 is pressed by hand, overcoming the force of spring 4, the turning block 3 rotates reversely, driving one end to withdraw from the holding groove 11, so as to cancel the limit on the bulge 21 of spectacle lens 2. Afterwards, the bulge 21 of spectacle lens 2 is removed from the holding groove 11 of half rim 1, and the inner groove of spectacle lens 2 is separated from the inner tenon of half rim 1, so as to implement easy disassembly of spectacle lens 2.

As shown in FIG. 1-FIG. 3, a type of spectacles of the present invention comprises two earpieces 6 and said linkage structure for rim and spectacle lenses, the front ends of two earpieces 6 are connected to the outer ends of two half rims 1 rotatablely.

Embodiment 2

Figure 4:
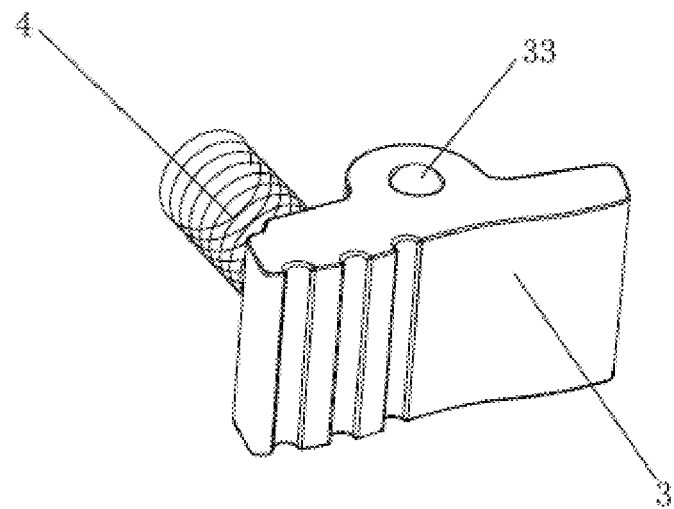
FIG. 4 is the structural representation of turning block of Embodiment 2 of the present invention.

As shown in FIG. 4, the difference between the linkage structure for rim and spectacle lenses of the present invention and Embodiment 1 is: there is a hemispherical bulge 33 on the upper and lower sides of middle part of said turning block 3 respectively, and the two bulges 33 are on the same axis. There is an axle hole in the inner top surface and bottom surface of said holding groove 11 respectively, the two bulges 33 plug in the two axle holes of said holding groove 11 rotatablely, so that said turning block 3 can revolve around the axis of the two bulges 33.

The present invention provides a linkage structure for rim and spectacle lenses, in order to implement the turn function of turning block 3, it can be connected to the outer end of half rim 1 by using other structures, for example, an axle hole can be made in the turning block 3, the corresponding pin 5 is set on the outer end of half rim 1.

A type of spectacles of the present invention comprises two earpieces and said linkage structure for rim and spectacle lenses. The front ends of two earpieces are connected to the outer ends of two half rims rotatablely.

Embodiment 3

Figure 5:
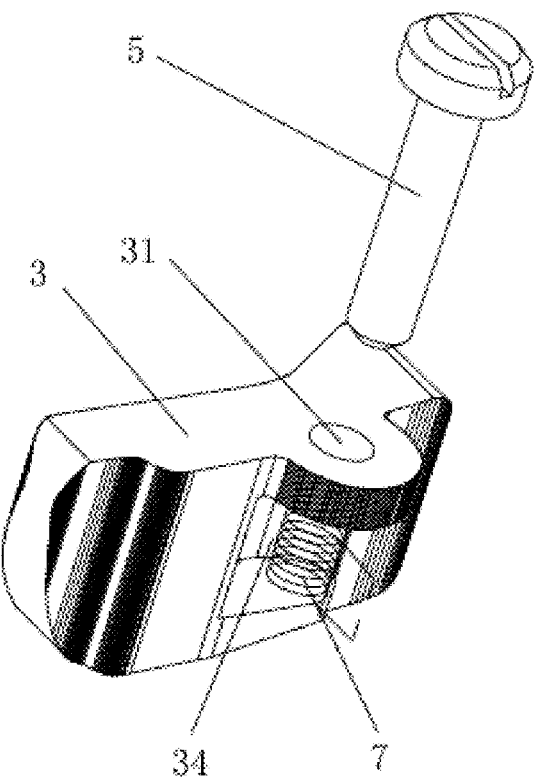
FIG. 5 is the exploded view of turning block and torsion spring of Embodiment 3 of the present invention.

As shown in FIG. 5, the difference between the linkage structure for rim and spectacle lenses of the present invention and Embodiment 1 is: said elastic piece is torsion spring 7, the torsion spring 7 fits over the pin 5 of turning block 3, and both ends support the outer end of said half rim 1 (inside of said holding groove 11) and said turning block 3 respectively. As an optimization, there is a gap 34 on the middle side of said turning block 3, and the gap 34 penetrates through the through hole 31 of said turning block 3, and divides the through hole 31 into upper and lower parts. The spiral part of said torsion spring 7 is in the gap 34.

The linkage structure for rim and spectacle lenses of the present invention is the same as Embodiment 1, to assemble the spectacle lens 2, the other end of turning block 3 is pressed by hand, one end of turning block 3 is rolled out of the holding groove 11 overcoming the torque of torsion spring 7. Afterwards, the outer bulge 21 of spectacle lens 2 is held in the holding groove 11 of half rim 1, the inner groove of spectacle lens 2 buckles the inner tenon of half rim 1. Finally, the turning block 3 is released, the turning block 3 rotates towards the inner end of holding groove 11 under the restoring force of torsion spring 7, till one end contacts the bulge 21 of spectacle lens 2, confining the bulge 21 of spectacle lens 2 in the holding groove 11 of half rim 1 firmly, the spectacle lens 2 is fixed to the rim.

To disassemble spectacle lens 2, the other end of turning block 3 is pressed by hand, overcoming the torque of torsion spring 7, the turning block 3 rotates reversely, driving one end to withdraw from the holding groove 11, so as to cancel the limit on the bulge 21 of spectacle lens 2. Afterwards, the bulge 21 of spectacle lens 2 is removed from the holding groove 11 of half rim 1, and the inner groove of spectacle lens 2 is separated from the inner tenon of half rim 1, so as to implement easy disassembly of spectacle lens 2.

A type of spectacles of the present invention comprises two earpieces and said linkage structure for rim and spectacle lenses. The front ends of two earpieces are connected to the outer ends of two half rims rotatablely.

Embodiment 4

Figure 6:
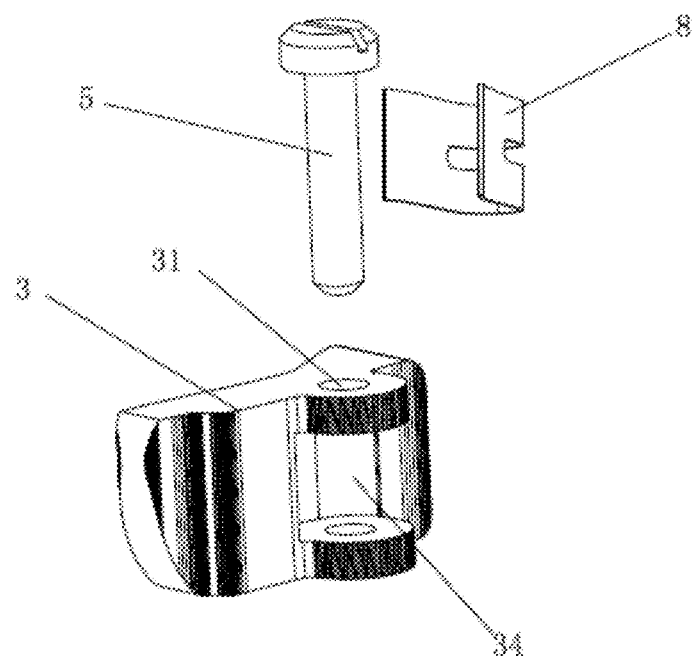
FIG. 6 is the exploded view of turning block and elastic buckle clamp of Embodiment 4 of the present invention.
Figure 7:
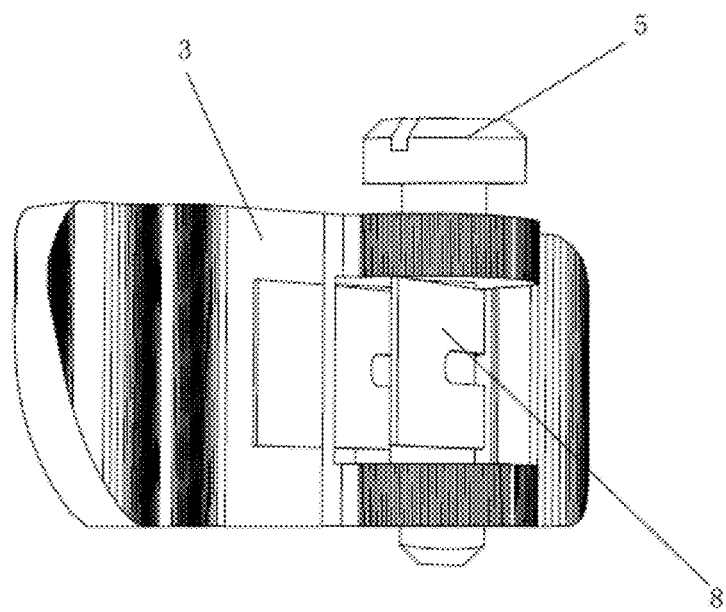
FIG. 7 is the structural representation of turning block assembled with elastic buckle clamp of Embodiment 4 of the present invention.

As shown in FIG. 6 and FIG. 7, the difference between the linkage structure for rim and spectacle lenses of the present invention and Embodiment 1 is: said elastic piece is a U-shaped elastic buckle clamp 8, the elastic buckle clamp 8 fits over the pin 5 of said turning block 3, and both ends support the outer end of said half rim 1 and said turning block 3 respectively. Similar to Embodiment 2, there is a gap 34 on the middle side of said turning block 3, and the gap 34 penetrates through the through hole 31 of said turning block 3, and divides the through hole 31 into upper and lower parts. Said elastic buckle clamp 8 matches the gap 34.

In terms of the linkage structure for rim and spectacle lenses of the present invention, to assemble the spectacle lens 2, the other end of turning block 3 is pressed by hand, one end of turning block 3 is rolled out of the holding groove 11 overcoming the force of elastic buckle clamp 8. Afterwards, the outer bulge 21 of spectacle lens 2 is held in the holding groove 11 of half rim 1, the inner groove of spectacle lens 2 buckles the inner tenon of half rim 1. Finally, the turning block 3 is released, the turning block 3 rotates towards the inner end of holding groove 11 under the restoring force of elastic buckle clamp 8, till one end contacts the bulge 21 of spectacle lens 2, confining the bulge 21 of spectacle lens 2 in the holding groove 11 of half rim 1 firmly, the spectacle lens 2 is fixed to the rim.

To disassemble spectacle lens 2, the other end of turning block 3 is pressed by hand, overcoming the elasticity of elastic buckle clamp 8, the turning block 3 rotates reversely, driving one end to withdraw from the holding groove 11, so as to cancel the limit on the bulge 21 of spectacle lens 2. Afterwards, the bulge 21 of spectacle lens 2 is removed from the holding groove 11 of half rim 1, and the inner groove of spectacle lens 2 is separated from the inner tenon of half rim 1, so as to implement easy disassembly of spectacle lens 2.

A type of spectacles in the present invention comprises two earpieces and said linkage structure for rim and spectacle lenses. The front ends of two earpieces are connected to the outer ends of two half rims rotatablely.

Although the invention has been explained in relation to its preferred embodiment, it is to be understood that many other possible modifications and variations can be made without departing from the spirit and scope of the invention as hereinafter claimed.

The invention claimed is:

1. A linkage structure for spectacles comprising:
    a rim comprising left and right half rims with a holding groove inside an outer end of each of the two half rims;
    a turning block connected to the outer ends of each of the two half rims and rotatable about a vertical axis;
    two spectacle lenses with a bulge on an outer end of each of the two spectacle lenses wherein the bulge is held in the holding groove of the respective half rim via compression force by the respective turning block;
    an elastic piece arranged between each turning block and the respective outer end of the respective half rim so as to apply the compression force; and
    a separable positioning structure arranged between an inner end of each spectacle lens and an inner end of each half rim.

2. The linkage structure for spectacles as claimed in claim 1, wherein said elastic piece is a spring located between the outer end of said half rim and an opposite inside of the turning block.

3. The linkage structure for spectacles as claimed in claim 1, wherein said turning block is connected to the outer end of said half rim by a pin and wherein the elastic piece is a u-shaped elastic buckle clamp fitting over the pin.

4. The linkage structure spectacles as claimed in claim 3, wherein said turning block has a vertically extending through hole for said pin and further comprising a gap at a side of said turning block penetrating through said through hole to divide the through hole into upper and lower parts; said elastic buckle clamp matches the gap.

5. The linkage structure for spectacles as claimed in claim 1, wherein said turning block is connected to the outer end of said half rim by a pin and wherein the elastic piece is a torsion spring fitting over the pin.

6. The linkage structure for spectacles as claimed in claim 5, wherein said turning block has a vertically extending through hole for said pin and further comprising a gap at a side of said turning block penetrating through said through hole to divide the through hole into upper and lower parts; the spiral part of said torsion spring is in the gap.

7. The linkage structure for spectacles as claimed in claim 1, wherein said separable positioning structure comprises a through groove in the inner end of said spectacle lens and a tenon on the inner end of said half rim; the tenon matches the groove.

8. The linkage structure for spectacles as claimed in claim 1, further comprising an opening in opposite inner ends of the holding groove of each of the two half rims respectively, to make room for the bulge of said spectacle lens and an indentation at the outer end side of said spectacle lens, the upside structure of the indentation forms said bulge; the indentation buckles the underside structure of said holding groove.

9. The linkage structure for spectacles as claimed in claim 1, further comprising an antislip stripe on a side of the turning block arranged against said holding groove.

10. Spectacles comprising two earpieces and a linkage structure for spectacles of claim 1; front ends of each of the two earpieces are connected to the outer ends of said two half rims respectively.

* * * * *